United States Patent
Hajiloo et al.

(10) Patent No.: US 12,479,418 B2
(45) Date of Patent: Nov. 25, 2025

(54) VEHICLE WHEEL FORCE CONTROL SYSTEMS

(71) Applicant: GM GLOBAL TECHNOLOGY OPERATIONS LLC, Detroit, MI (US)

(72) Inventors: Reza Hajiloo, Richmond Hill (CA); Ali Reza Armiyoon, Markham (CA); Seyedalireza Kasaiezadeh Mahabadi, Novi, MI (US); Mustafa Hakan Turhan, Kitchener (CA); Naser Mehrabi, Richmond Hill (CA); Hualin Tan, Novi, MI (US); Jin-Jae Chen, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 18/394,909

(22) Filed: Dec. 22, 2023

(65) Prior Publication Data
US 2025/0206290 A1 Jun. 26, 2025

(51) Int. Cl.
*B60W 30/02* (2012.01)
*B60L 15/20* (2006.01)
(Continued)

(52) U.S. Cl.
CPC ............. *B60W 30/02* (2013.01); *B60L 15/20* (2013.01); *B60W 40/11* (2013.01);
(Continued)

(58) Field of Classification Search
CPC .... B60W 30/02; B60W 40/11; B60W 40/112; B60W 2510/22; B60W 2520/105;
(Continued)

(56) References Cited

U.S. PATENT DOCUMENTS 9,713,947 B2 * 7/2017 Irwin .................. B62D 35/005
10,768,074 B2 9/2020 Kasaiezadeh Mahabadi et al.
(Continued)

FOREIGN PATENT DOCUMENTS

| DE | 102016203637 A1 | 9/2016 |
| EP | 3153375 A1 | 4/2017 |
| EP | 4048986 B1 | 8/2023 |

OTHER PUBLICATIONS

German Office Action from counterpart DE102024103891.8, dated Jul. 23, 2024.

*Primary Examiner* — Sze-Hon Kong

(57) ABSTRACT

A vehicle wheel force control system includes multiple vehicle wheel height sensors, a vehicle IMU configured to measure lateral and longitudinal acceleration, and a vehicle control module is configured to obtain vehicle wheel height parameters from the multiple vehicle wheel height sensors, obtain a vehicle lateral and longitudinal acceleration parameters from the vehicle IMU, estimate a pitch arm rotation value of the vehicle, determine a pitch center of the vehicle based on the pitch arm rotation value, the vehicle wheel height parameters and the vehicle lateral acceleration parameter and the vehicle longitudinal acceleration parameter, calculate a center of gravity of the vehicle according to the determined pitch center, determine an estimated normal force on at least one wheel of the vehicle based, at least in part, on the calculated center of gravity of the vehicle, and control operation of at least one vehicle component according to the estimated normal force.

20 Claims, 11 Drawing Sheets

(51) Int. Cl.
   *B60W 40/11* (2012.01)
   *B60W 40/112* (2012.01)
   *B62D 35/00* (2006.01)

(52) U.S. Cl.
   CPC ........... *B60W 40/112* (2013.01); *B62D 35/00* (2013.01); *B60W 2510/22* (2013.01); *B60W 2520/105* (2013.01); *B60W 2520/125* (2013.01); *B60W 2710/30* (2013.01); *B60W 2720/30* (2013.01)

(58) Field of Classification Search
   CPC ....... B60W 2520/125; B60W 2710/30; B60W 2720/30; B60L 15/20; B62D 35/00
   See application file for complete search history.

(56) References Cited

U.S. PATENT DOCUMENTS

| | | | |
|---|---|---|---|
| 2005/0242532 A1* | 11/2005 | Deo | F16F 15/022 280/5.5 |
| 2005/0280219 A1* | 12/2005 | Brown | B60G 3/20 280/5.52 |
| 2006/0076741 A1* | 4/2006 | Lim | B60G 17/0162 280/5.508 |
| 2008/0059021 A1* | 3/2008 | Lu | B60G 17/0195 701/36 |
| 2015/0073744 A1* | 3/2015 | Herrera | G01B 21/22 702/141 |
| 2015/0352920 A1* | 12/2015 | Lakehal-Ayat | B60G 17/0182 701/38 |
| 2017/0101108 A1* | 4/2017 | Singh | B60C 23/0488 |
| 2020/0094645 A1* | 3/2020 | Edren | B60W 10/22 |
| 2020/0317018 A1* | 10/2020 | Nong | G05D 1/027 |
| 2020/0368629 A1* | 11/2020 | Moss | A63H 17/21 |
| 2021/0276642 A1* | 9/2021 | Gillett | B25J 5/007 |
| 2021/0283969 A1* | 9/2021 | Danielson | B60G 17/0195 |
| 2023/0043104 A1* | 2/2023 | Abdallah | B60G 17/0525 |
| 2023/0150330 A1* | 5/2023 | Yamada | B60G 17/0195 280/5.504 |
| 2023/0331056 A1* | 10/2023 | Birch | B60G 17/0164 |
| 2023/0391206 A1* | 12/2023 | Sallee | B60W 10/08 |
| 2024/0217296 A1* | 7/2024 | Wang | B60G 3/207 |

* cited by examiner

VEHICLE WHEEL FORCE CONTROL SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle wheel force control systems, including estimation of wheel normal forces via a combination of inertial measurement unit (IMU)-based and spring-based estimation values.

In many challenging driving scenarios, control actions such as wheel and/or axle torques may be allocated in an optimal manner such that tire capacity is fully utilized in longitudinal and lateral directions. Typical tire capacity management is performed with on-board computing platforms or controllers and sensors, including inertial measurement units (IMUs) configured to measure how the vehicle moves in space. IMUs may be configured to measure vehicle acceleration in three axes: x (forward/back), y (side-to-side), and z (up/down). IMUs may additionally measure how quickly the motor vehicle is turning about the three axes, referred to as the pitch rate (about y), yaw rate (about z), and roll rate (about x). On-board computing platforms or controllers use the measurement data to estimate forces acting on the vehicle.

SUMMARY

A vehicle wheel force control system includes multiple vehicle wheel height sensors each configured to measure a wheel height position of a corresponding wheel of a vehicle, a vehicle inertial measurement unit (IMU) configured to measure a lateral acceleration of the vehicle and a longitudinal acceleration of the vehicle, and a vehicle control module in communication with the multiple vehicle wheel height sensors and the vehicle IMU. The vehicle control module is configured to obtain vehicle wheel height parameters from the multiple vehicle wheel height sensors, obtain a vehicle lateral acceleration parameter and a vehicle longitudinal acceleration parameter from the vehicle IMU, estimate a pitch arm rotation value of the vehicle, determine a pitch center of the vehicle based on the pitch arm rotation value, the vehicle wheel height parameters and the vehicle lateral acceleration parameter and the vehicle longitudinal acceleration parameter, calculate a center of gravity of the vehicle according to the determined pitch center, determine an estimated normal force on at least one wheel of the vehicle based, at least in part, on the calculated center of gravity of the vehicle, and control operation of at least one vehicle component according to the estimated normal force.

In other examples, the estimated normal force is an IMU-based estimated normal force, and the vehicle control module is configured to determine a longitudinal acceleration-based anti-dive compensation value according to at least the vehicle longitudinal acceleration parameter, determine a pitch angle-based anti-dive compensation value according to at least the vehicle longitudinal acceleration parameter, calculate a combined anti-dive compensation value according to the longitudinal acceleration-based anti-dive compensation value and the pitch angle-based anti-dive compensation value, and determine a spring-based estimated normal force on the at least one wheel of the vehicle based, at least in part, on the combined anti-dive compensation value.

In other examples, the vehicle control module is configured to determine a lateral acceleration-based roll rate compensation value according to at least the vehicle lateral acceleration parameter, determine a roll angle-based roll rate compensation value according to at least the vehicle longitudinal acceleration parameter, calculate a combined roll rate compensation value according to the lateral acceleration-based roll rate compensation value and the roll angle-based roll rate compensation value, and determine a spring-based estimated normal force on the at least one wheel of the vehicle based, at least in part, on the combined roll rate compensation value.

In other examples, the vehicle control module is configured to calculate a suspension spring displacement value for at least one spring of a suspension of the vehicle, calculate a suspension spring damping force value for the at least one spring of a suspension of the vehicle, and determine the spring-based estimated normal force on the at least one wheel of the vehicle based, at least in part, on the suspension spring displacement value and the suspensions spring damping force.

In other examples, the vehicle control module is configured to determine, via a trained machine learning model, reliability scores for the IMU-based estimated normal force and the spring-based estimated normal force, and determined a combined estimated normal force on the at least one wheel of the vehicle according to a weighted combination of the IMU-based estimated normal force and the spring-based estimated normal force, wherein the weighted combination is assigned based on the reliability scores for the IMU-based estimated normal force and the spring-based estimated normal force.

In other examples, the trained machine learning model is trained based on multiple failure modes each associated with at least one of the IMU-based estimated normal force and the spring-based estimated normal force, and each of the multiple failure modes is associated with one or more corresponding vehicle parameters indicative of the failure mode.

In other examples, the vehicle control module is configured to compare the vehicle longitudinal acceleration parameter to a specified excessive acceleration threshold, reset a value of a vehicle pitch angle in response to the vehicle longitudinal acceleration parameter exceeding the specified excessive acceleration threshold, and perform integration of the vehicle pitch rate in response to the vehicle longitudinal acceleration parameter being less than the specified excessive acceleration threshold.

In other examples, the vehicle control module is configured to obtain a pitch center location function, wherein the pitch center location function is determined offline according to at least one geometry pattern of a suspension of the vehicle, and determine the pitch center of the vehicle online, based at least in part on the pitch center location function.

In other examples, controlling operation of at least one vehicle component includes at least one of controlling a position of a moveable aerodynamic surface of the vehicle based on the estimated normal force, or controlling an amount of torque supplied to at least one wheel of the vehicle based on the estimated normal force.

In other examples, the vehicle control module is configured to estimate the pitch arm rotation value of the vehicle by calculating a rotational pitch acceleration value of the vehicle based on the vehicle longitudinal acceleration parameter, and estimating the pitch arm rotation value of the vehicle based on the calculated rotational pitch acceleration value using least squares.

In other examples, the vehicle control module is configured to determine a rigid body lateral load transfer value of the vehicle, determine a rigid body longitudinal load transfer value of the vehicle, determine a suspension compensated lateral load transfer value of the vehicle, determine a suspension compensated longitudinal load transfer value of the vehicle, and determine the estimated normal force on the at least one wheel of the vehicle based, at least in part, on the rigid body lateral load transfer value, rigid body longitudinal load transfer value, suspension compensated lateral load transfer value and suspension compensated longitudinal load transfer value of the vehicle.

A vehicle wheel force control system includes multiple vehicle wheel height sensors each configured to measure a wheel height position of a corresponding wheel of a vehicle, a vehicle inertial measurement unit (IMU) configured to measure a lateral acceleration of the vehicle and a longitudinal acceleration of the vehicle, and a vehicle control module in communication with the multiple vehicle wheel height sensors and the vehicle IMU. The vehicle control module is configured to obtain vehicle wheel height parameters from the multiple vehicle wheel height sensors, obtain a vehicle lateral acceleration parameter and a vehicle longitudinal acceleration parameter, determine a longitudinal acceleration-based anti-dive compensation value according to at least the vehicle longitudinal acceleration parameter, determine a pitch angle-based anti-dive compensation value according to at least the vehicle longitudinal acceleration parameter, calculate a combined anti-dive compensation value according to the longitudinal acceleration-based anti-dive compensation value and the pitch angle-based anti-dive compensation value, determine an estimated normal force on at least one wheel of the vehicle based, at least in part, on the combined anti-dive compensation value, and control operation of at least one vehicle component according to the estimated normal force.

In other examples, the vehicle control module is configured to determine a lateral acceleration-based roll rate compensation value according to at least the vehicle lateral acceleration parameter, determine a roll angle-based roll rate compensation value according to at least the vehicle longitudinal acceleration parameter, calculate a combined roll rate compensation value according to the lateral acceleration-based roll rate compensation value and the roll angle-based roll rate compensation value, and determine the estimated normal force on the at least one wheel of the vehicle based, at least in part, on the combined roll rate compensation value.

In other examples, the vehicle control module is configured to calculate a suspension spring displacement value for at least one spring of a suspension of the vehicle, calculate a suspension spring damping force value for the at least one spring of a suspension of the vehicle, and determine the estimated normal force on the at least one wheel of the vehicle based, at least in part, on the suspension spring displacement value and the suspensions spring damping force.

In other examples, controlling operation of at least one vehicle component includes at least one of controlling a position of a moveable aerodynamic surface of the vehicle based on the estimated normal force, or controlling an amount of torque supplied to at least one wheel of the vehicle based on the estimated normal force.

In other examples, the vehicle control module is configured to determine, via a trained machine learning model, a reliability scores for the estimated normal force.

In other examples, the trained machine learning model is trained based on multiple failure modes each associated with the estimated normal force, and each of the multiple failure modes is associated with one or more corresponding vehicle parameters indicative of the failure mode.

A vehicle wheel force control system includes multiple vehicle wheel height sensors each configured to measure a wheel height position of a corresponding wheel of a vehicle, a vehicle inertial measurement unit (IMU) configured to measure a lateral acceleration of the vehicle and a longitudinal acceleration of the vehicle, and a vehicle control module in communication with the multiple vehicle wheel height sensors and the vehicle IMU. The vehicle control module configured to obtain vehicle wheel height parameters from the multiple vehicle wheel height sensors, obtain vehicle lateral acceleration and vehicle longitudinal acceleration parameters from the vehicle IMU, determine IMU-based estimated normal force on at least one wheel of the vehicle based, at least in part, on a calculated center of gravity of the vehicle, determine a spring-based estimated normal force on the at least one wheel of the vehicle based, at least in part, on a combined anti-dive compensation value and a calculated combined anti-dive compensation value, determine, via a trained machine learning model, reliability scores for the IMU-based estimated normal force and the spring-based estimated normal force, determined a combined estimated normal force on the at least one wheel of the vehicle according to a weighted combination of the IMU-based estimated normal force and the spring-based estimated normal force, wherein the weighted combination is assigned based on the reliability scores for the IMU-based estimated normal force and the spring-based estimated normal force, and control operation of at least one vehicle component according to the combined estimated normal force.

In other examples, the trained machine learning model is trained based on multiple failure modes each associated with at least one of the IMU-based estimated normal force and the spring-based estimated normal force, and each of the multiple failure modes is associated with one or more corresponding vehicle parameters indicative of the failure mode.

In other examples, controlling operation of at least one vehicle component includes at least one of controlling a position of a moveable aerodynamic surface of the vehicle based to the combined estimated normal force, or controlling an amount of torque supplied to at least one wheel of the vehicle based on the combined estimated normal force.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some example embodiments described herein implement vehicle control systems including reliable and robust algorithms for wheel normal force estimation. IMU-based and spring-based normal force estimation methods may be used individually, to address typically unmodeled terms in the IMU-based and spring-based methods. The longitudinal and lateral vehicle acceleration measured by the IMU may be fused with information from spring displacement sensors, to provide a more accurate and robust response for calculating anti-effects (anti-dive, anti-lift, etc.) used in the spring-based method.

In some examples, a data fusion strategy may be used to combine the IMU-based and spring-based normal force estimation methods based on their degradation modes analysis. Changes in longitudinal load transfer may be considered in various example vehicle control systems, along with effects of changes in a center of gravity of the vehicle, and vehicle pitch center locations during excessive longitudinal accelerations.

Integrating vehicle lateral and longitudinal acceleration information with wheel to body sensor information may provide a more accurate and robust estimation of anti-roll and anti-dive/anti-lift effects in a spring-based normal force estimation algorithm. Compensating for unmodeled suspension effects due to roll/pitch dynamics in an IMU-based normal force estimation method may also improve accuracy. In some examples, a machine learning model may be used for fusion (e.g., combination) of spring-based and IMU-based estimation methods, by finding degradation modes (e.g., failure areas in a vehicle parameter space) of each technique, to increase the accuracy and robustness of the estimated normal force.

The improved estimated normal force may enhance vehicle motion control reliability, by improving stability and providing an increased customer experience with improved performance and safety. For example, a vehicle control module may be configured to control one or more components of the vehicle based on the normal force estimation, such as adjusting a position of an aerodynamic component of the vehicle (e.g., a rear vehicle wing angle), adjusting torque applied to one or more vehicle wheels, etc.

In some examples, IMU-based estimation may include an inertia-based vertical tire force model which uses static vehicle parameters from the inertial measurement unit for estimation of wheel normal force. Spring-based estimation may include a suspension based vertical tire model which uses force and displacement curves from VHF data, as well as wheel to body relative displacement, for normal force estimation.

Figure 1:
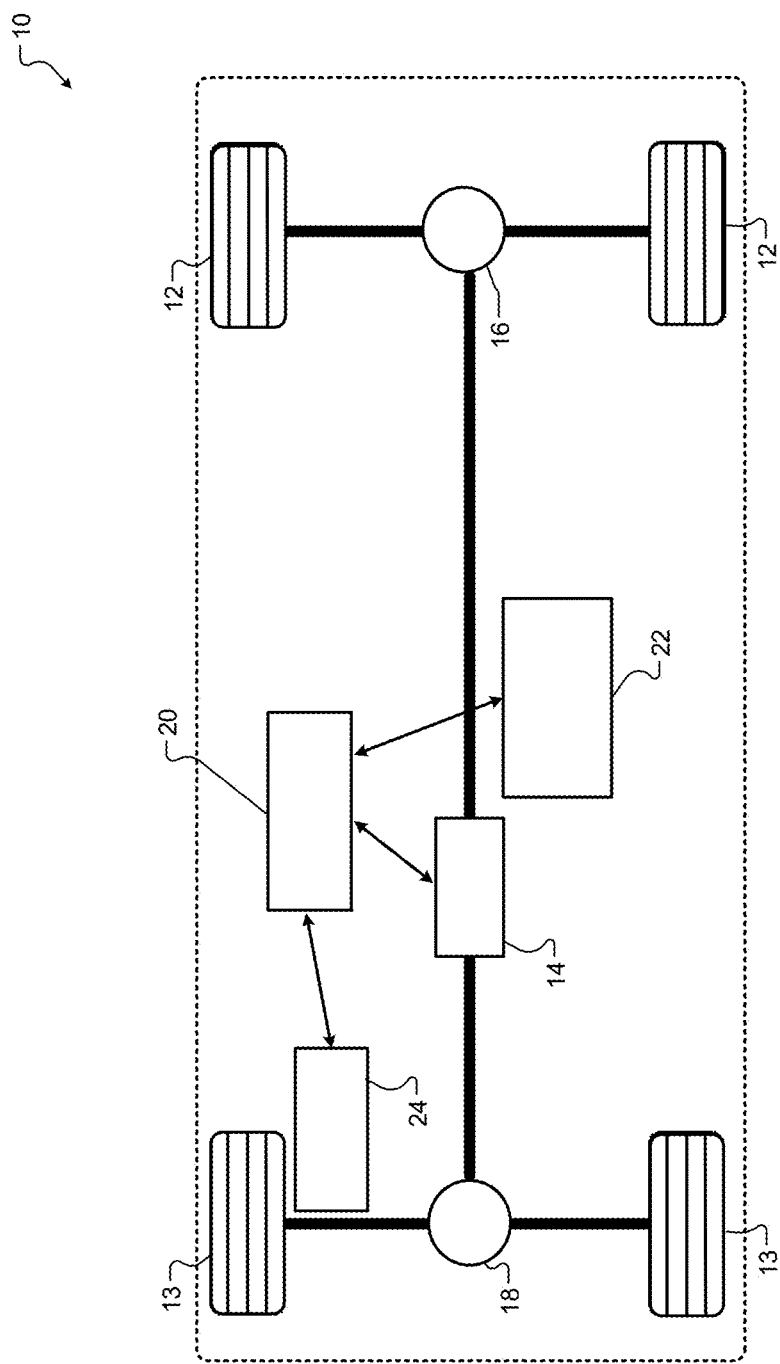
FIG. 1 is a diagram of an example vehicle including a vehicle control module configured to estimate vehicle wheel normal force values.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, steering wheel position sensors, braking sensors, location sensors such as global positioning system (GPS) antennas, wheel height and/or position sensors, accelerometers, etc.). Some sensors may be configured to monitor current motion of the vehicle, acceleration of the vehicle, braking of the vehicle, current steering direction of the vehicle, current height and/or position of one or more wheels, etc.

As shown in FIG. 1, the vehicle 10 includes an inertial measurement unit (IMU) 22. The IMU 22 is configured to measure motion of the vehicle in one or more directions, such as a lateral acceleration of the vehicle, a longitudinal acceleration of the vehicle, etc.

Figure 2:
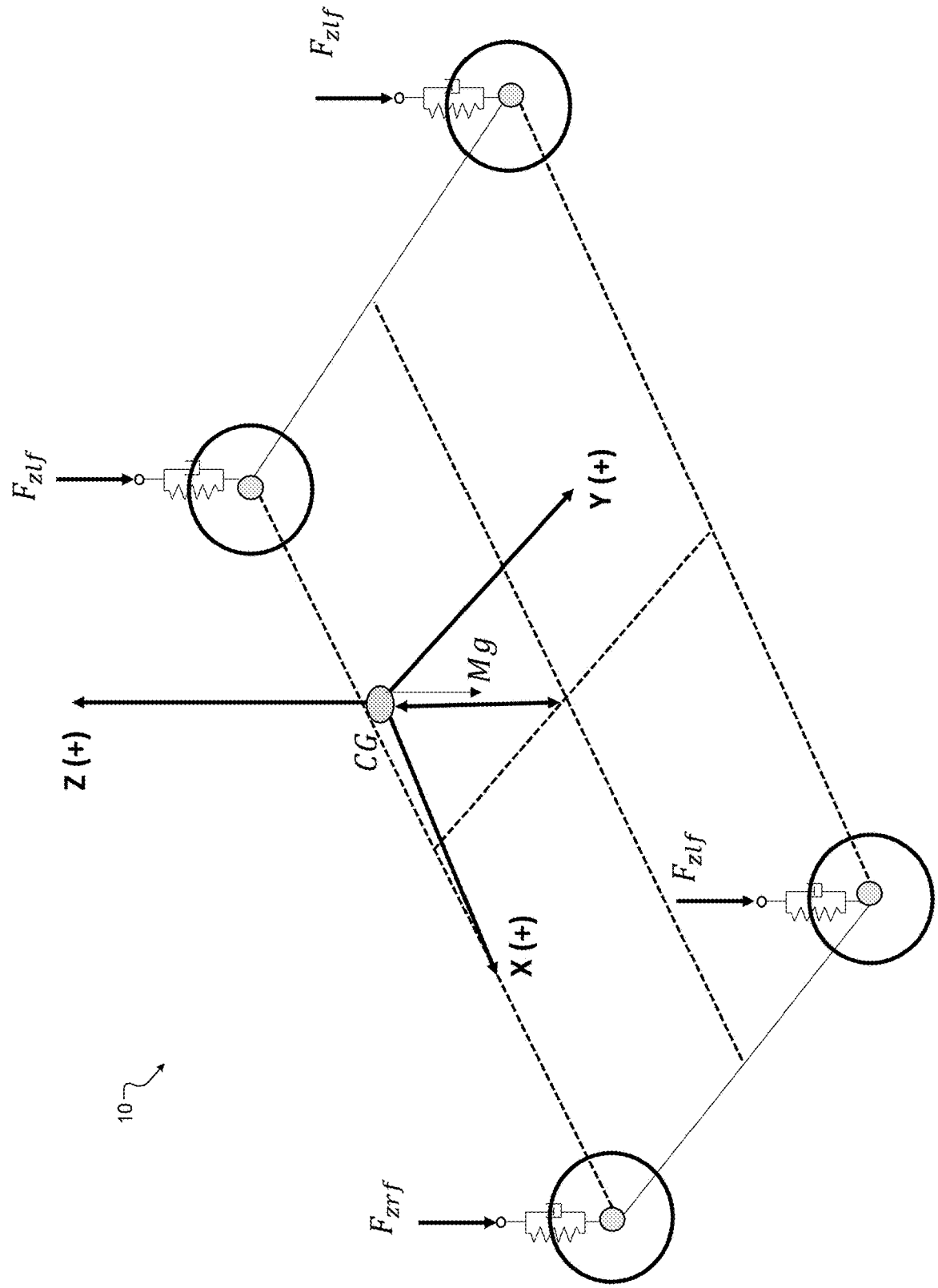
FIG. 2 is orthogonal diagram illustrating example directional forces experienced by a vehicle.

FIG. 2 illustrates example directional forces and motion which may be experienced by the vehicle 10. Some of the directional forces and motion may be measured by the IMU 22. In some example embodiments, a lateral direction of the vehicle 10 from side to side may be considered as an 'x' direction a longitudinal direction of the vehicle 10 from front to back may be considered as a 'y' direction, and a direction normal to a road surface from a top to bottom of the vehicle may be considered as a 'z' direction.

Referring again to FIG. 1, the vehicle control module 20 is in communication with the IMU 22 (and may optionally include the IMU 22 as part of the vehicle control module 20). The vehicle control module 20 may be configured to obtain vehicle parameters sensed by the IMU 22, such as a lateral acceleration and a longitudinal acceleration of the vehicle 10.

The vehicle 10 also includes other vehicle sensors 24, which may include any suitable sensors for detecting vehicle parameters. For example, the vehicle sensors 24 may include multiple wheel height sensors each configured to measure a height and/or position of a front wheel 12 or the rear wheel 13 of the vehicle, one or more accelerometers, one or more sensors configured to measure properties of a suspension of the vehicle 10 (such as a displacement or damping force of springs of the suspension), etc.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

Figure 3:
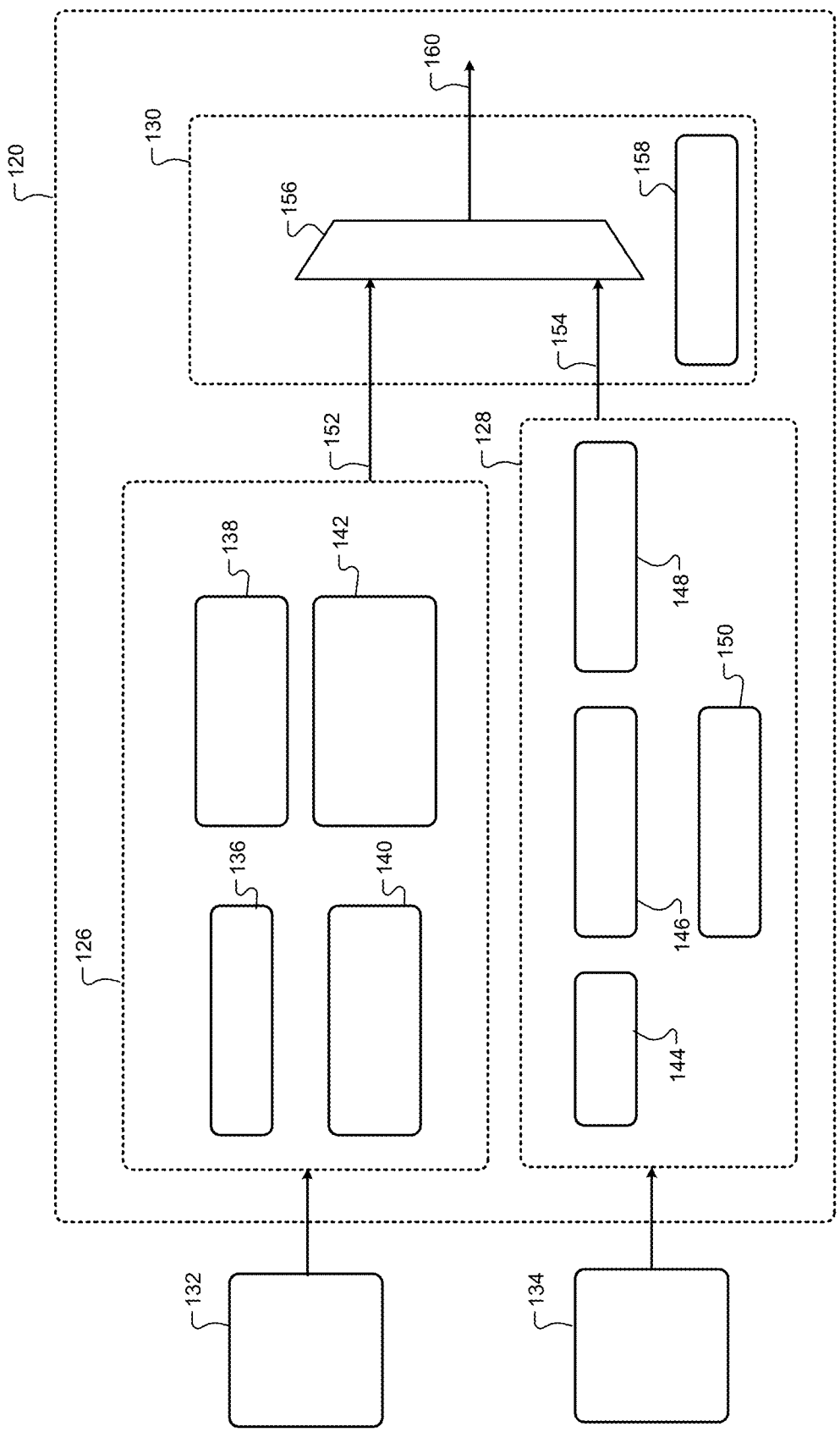
FIG. 3 is a block diagram of example IMU-based and spring-based compensation modules for estimating vehicle wheel normal force values.

FIG. 3 is an illustration of an example of IMU-based and spring-based compensation modules for estimating vehicle wheel normal force value. As shown in FIG. 3, the vehicle control module 120 includes an inertial measurement unit (IMU) compensation module 126, a spring-based compensation module 128, and a failure mode module 130. Each of the modules illustrated in FIG. 3 may be executed by one or more processors, such as one or more processors executing computer readable instructions stored in memory.

The inertial measurement unit compensation module 126 is configured to receive IMU vehicle parameters 132, such as a lateral acceleration of the vehicle, a longitudinal acceleration of the vehicle, etc. The inertial measurement unit compensation module 126 is configured to calculate a rigid body lateral load transfer 136, and a rigid body longitudinal load transfer 138.

The inertial measurement unit compensation module 126 is configured to determine a suspension compensated lateral load transfer 140, and a suspension compensated longitudinal load transfer 142. Any suitable equations may be used to determine or calculate values of the corresponding modules. In other example embodiments, the inertial measurement unit compensation module 126 may include more or less calculations, more or less modules, etc.

Some IMU-based estimation models may consider the vehicle as one rigid body, while ignoring effects of the vehicle suspension system. However, effects of the vehicle suspension system during a roll motion may be considered using calibrations. The calibrations may be linearly dependent on lateral acceleration, where they only come into effect when lateral acceleration of the vehicle is high (e.g., above a lateral acceleration threshold). Example equations for determining a normal force (Fz) for a left front (LF) wheel, a right front (RF) wheel, a left rear (LR) wheel, and a right rear (RR) wheel, are presented below:

$$K_{AxleCorr,i} = (K_{ADL,i} a_x + 1), i = F, R$$

$$F_{z,ij} = K_{AxleCorr,i} F_{z,ij}, j = L, R$$

$$F_{z,LF} = K_{AxleCorr,F} \left( \frac{1}{2} F_{zf} - \left( \frac{h_{CG}}{\frac{T_F + T_R}{2}} M a_y \right) * TLLTD \right)$$

$$F_{z,RF} = K_{AxleCorr,F} \left( \frac{1}{2} F_{zf} + \left( \frac{h_{CG}}{\frac{T_F + T_R}{2}} M a_y \right) * TLLTD \right)$$

$$F_{z,LR} = K_{AxleCorr,R} \left( \frac{1}{2} F_{zr} - \left( \frac{h_{CG}}{\frac{T_F + T_R}{2}} M a_y \right) * (1 - TLLTD) \right)$$

$$F_{z,RR} = K_{AxleCorr,R} \left( \frac{1}{2} F_{zr} + \left( \frac{h_{CG}}{\frac{T_F + T_R}{2}} M a_y \right) * (1 - TLLTD) \right)$$

The spring-based compensation module 128 is configured to receive spring-based vehicle parameters 134, such as vehicle wheel height values obtained from wheel height sensors. The spring-based compensation module 128 is configured to determine a ride rate 144, a roll angle-based roll rate compensation 146, an anti-dive compensation 148, and a lateral acceleration-based roll rate compensation 150. Any suitable equations may be used to determine or calculate values of the corresponding modules. Other example embodiments of the spring-based compensation module 128 may include more or less modules.

The failure mode module 130 includes a fusion module 156 and a failure mode detection module 158. The fusion module is configured to receive an IMU estimation value 152, from the inertial measurement unit compensation module 126. The fusion module 156 is also configured to receive a spring-based normal force estimation value 154 from the spring-based compensation module 128.

The fusion module 156 is configured to combine the IMU estimation value 152 with the spring-based normal force estimation value 154. The combination may be weighted by the failure mode detection module 158, which may include predicting reliability of each of the IMU estimation value 152 and the spring-based normal force estimation value 154, based on a trained machine learning model used to predict reliability of normal force estimation values. The failure mode module 130 is configured to output an estimated normal force 160 experienced by one or more wheels of the vehicle. For example, the failure mode module 130 may output multiple normal force estimation values each corresponding to a different one of the wheels of the vehicle.

Figure 4:
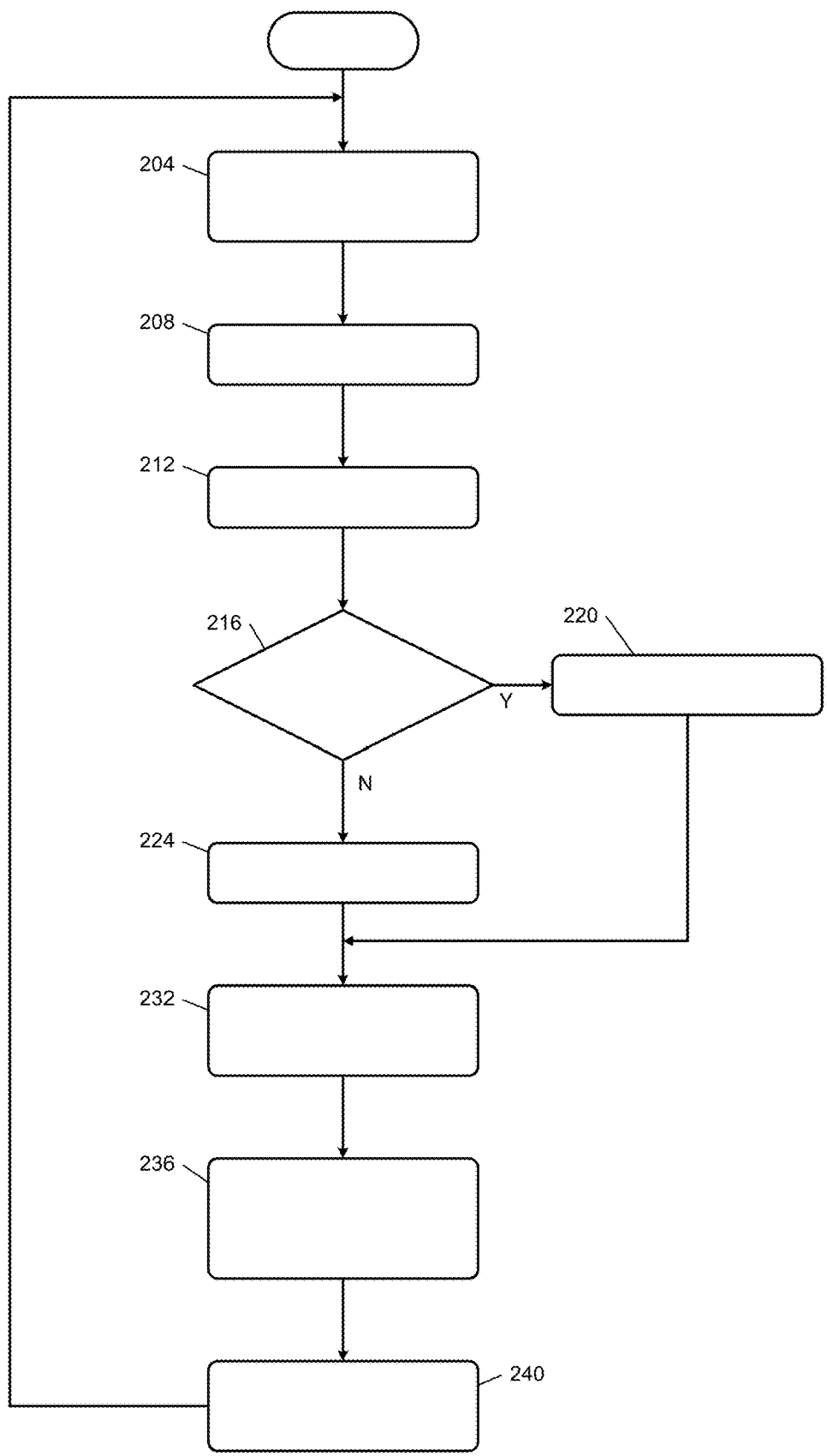
FIG. 4 is a flowchart depicting an example process for generating an IMU-based normal force estimation.

FIG. 4 is a flowchart depicting an example process for generating an IMU-based normal force estimation. The process may be performed by, for example, the vehicle control module 20 of FIG. 1 or the vehicle control module 120 of FIG. 3. At 204, the process begins by obtaining inertial measurement unit (IMU) vehicle parameters, such as lateral and longitudinal acceleration of the vehicle 10 as measured by the IMU 22 of FIG. 1.

At 208, the vehicle control module is configured to estimate a pitch arm rotation of the vehicle. Further details of estimating the pitch arm rotation of the vehicle are described further below with reference to FIG. 5. At 212, the vehicle control module is configured to obtain a vehicle longitudinal acceleration parameter from the IMU.

At 216, the vehicle control module is configured to determine whether the longitudinal acceleration is greater than an excessive acceleration value threshold. For example, if the longitudinal acceleration is greater than the specified threshold, control proceeds to 220 to reset a value of pitch angle of the vehicle. If the longitudinal acceleration is less than excessive value threshold, control proceeds to 224 to integrate the pitch rate of the vehicle.

A pitch center function may be generated offline, such as a function for determining a pitch center of a vehicle based on wheel height sensor values. Control then obtains current vehicle wheel height sensor values at 232, and calculates the current vehicle pitch center location online at 236, using the pitch center function that was previously created offline, and the current sensor values.

As the vehicle moves, especially in excessive cases, the orientation of suspension links changes, and accordingly the pitch center location changes. The pitch center location has an algebraic relationship with geometry of the suspension. In some examples, the algebraic location may be obtained offline from VHF test results. An example nonlinear function for determining the pitch center based on wheel height sensor values is:

$$[(x\_(P.C.), z\_(P.C.))''']\_ = f(x_{fl}, x_{fr}, x_{rl}, x_{rr})$$

This function may be used online to calculate a position of the pitch center in real time.

At 240, the vehicle control module is configured to calculate a vehicle center of gravity based on the calculated pitch center. In order to calculate the position of the center of gravity of the vehicle relative to the pitch center, a pitch angle, θ, may be used. This may be achieved by integrating the pitch rate, θ̇ with a condition based on longitudinal acceleration. The value of the pitch angle may be reset, and only updated when excessive acceleration is detected, to ensure accuracy of pitch angle estimation.

Figure 5:
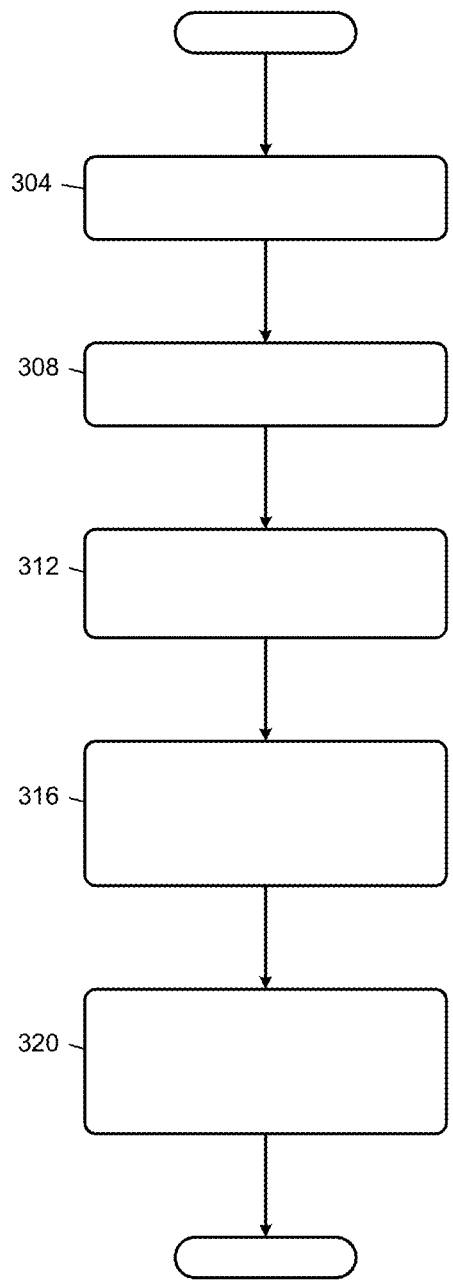
FIG. 5 is a flowchart depicting an example process for estimating the pitch rotation arm used in the process of FIG. 4.

FIG. 5 is a flowchart depicting an example process for estimating the pitch rotation arm used in the process of FIG. 4. 304, the process begins by obtaining vehicle velocity, wheel torque and road parameters. The vehicle control module is configured to calculate vehicle longitudinal acceleration at 308.

For example, the vehicle longitudinal acceleration may be determined based on the following equations (which may include a simplifying assumption where rolling resistance is not affected by road grade):

$$m\dot{v}_x = \frac{Trq}{r_w} - F_b - \frac{1}{2}\rho A_d C_d v_x^2 - mg\sin\theta - mgf_r\cos\theta$$

$$\dot{v}_x + g\sin\theta = a_x^{linear} = \frac{1}{m}\left(\frac{Trq}{r_w} - F_b - \frac{1}{2}\rho A_d C_d v_x^2\right) - gf_r$$

At 312, the vehicle control module is configured to obtain a vehicle acceleration value from the inertial measurement unit. Control then calculates the rotational pitch acceleration of the vehicle based on the longitudinal acceleration and the IMU acceleration value, at 316.

The control module is configured to estimate the pitch rotation arm of the vehicle based on the rotational pitch acceleration, using a least squares method, at 320. Example equations for calculating the rotational pitch acceleration and the estimated pitch rotation arm are provided below:

$$\vec{a}_x^{GrdDtct} = \vec{a}_x^{linear} + \vec{a}_x^{rotation}(h, \theta, \dot{\theta}, \ddot{\theta})$$

$$a_{rotation} = h(\dot{\theta}^2 + \ddot{\theta})$$

$\vec{a}^{Grdtct}$ is the measurement read by the IMU, which includes a gravity term. The pitch angular velocity and accelerations may also be measured and provided by PITR. $\vec{a}^{linear}$ may be calculated using the vehicle longitudinal acceleration calculation above, in normal driving conditions. Some calculations may assume that the value of the arm, h, does not change dynamically, as it is mainly dependent on the suspension geometry. The only unknown in the pitch rotation arm equation above is h, which can be estimated using a least square estimator.

Figure 6:
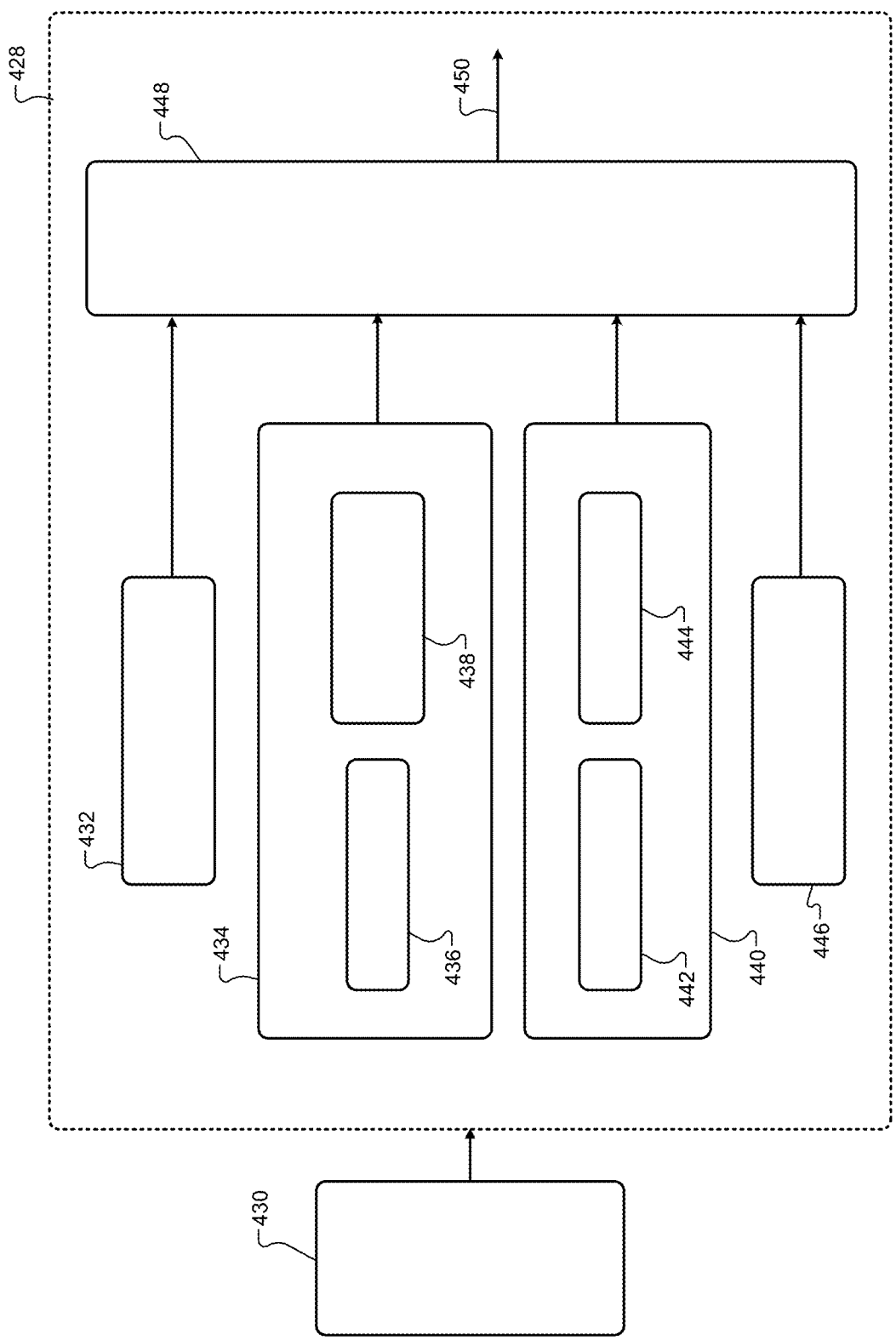
FIG. 6 is a block diagram of example spring-based compensation module for estimating vehicle wheel normal force values.

FIG. 6 is a block diagram of example spring-based compensation module for estimating vehicle wheel normal force values. As shown in FIG. 6, the vehicle spring-based compensation module 428 is configured to receive vehicle parameters 430, such as a lateral acceleration of the vehicle, a longitudinal acceleration of the vehicle, wheel height sensor parameters, etc.

The vehicle spring-based compensation module 428 is configured to determine a spring displacement force calculation 432, an anti-dive/anti-lift compensation 434, a roll rate compensation 440, and a damping force calculation 446. The anti-dive/anti-lift compensation 434 includes lateral acceleration (Ax)-based anti-dive compensation 436, and pitch angle-based anti-dive compensation 438. The roll rate compensation 440 includes longitudinal acceleration (Ay)-based roll rate compensation 442, and a roll angle-based roll rate compensation 444.

In some examples, estimated roll angle may have a dependency on ride height sensors, where a small bias or inaccuracy in corner displacement signals can degrade the reliability of the roll rate compensation term. Example equations for the roll angle-based roll rate compensation 444 are provided below:

$$F_{z_{rollrate\_LF}} = \tan^{-1}\left(\frac{x_{LF} - x_{RF}}{T_F}\right) * r_{aux\ rollrate,front} * K_{aux\ rollrate\ corr,front}$$

$$F_{z_{rollrate\_RF}} = -F_{z_{rollrate\_LF}}$$

$$F_{z_{rollrate\_LR}} = \tan^{-1}\left(\frac{x_{LR} - x_{RR}}{T_R}\right) * r_{aux\ rollrate,rear} * K_{aux\ rollrate\ corr,rear}$$

$$F_{z_{rollrate\_RR}} = -F_{z_{rollrate\_LR}}$$

The longitudinal acceleration (Ay)-based roll rate compensation 442 may decrease sensitivity/dependency to a spring set or spring displacement bias. A small bias in one corner may make a big change in roll angle estimation and consequently roll rate compensation term. In some examples, reliability of an Ay signal may be higher than that of ride height sensors, and results of Ay-based roll rate compensation may be more accurate than that of roll angle-based roll rate compensation. Example equations for Ay-based roll rate compensation are provided below:

$$F_{z_{rollrate\_LF}} = a_{y,f} * r_{aux\ roll\ comp,LF} * K_{aux\ roll\ comp,LF}$$

$$F_{z_{rollrate\_RF}} = a_{y,f} * r_{aux\ roll\ comp,RF} * K_{aux\ roll\ comp,RF}$$

-continued $$F_{z_{rollrate\_LR}} = a_{y,f} * r_{aux\ roll\ comp,LR} * K_{aux\ roll\ comp,RF}$$

$$F_{z_{rollrate\_RR}} = a_{y,f} * r_{aux\ roll\ comp,RR} * K_{aux\ roll\ comp,RF}$$

The spring displacement force calculation 432, the anti-dive/anti-lift compensation 434, the roll rate compensation 440, and the damping force calculation 446 may be combined by the spring-based normal force estimation module 448, to generate a spring-based estimation of the normal force 450 on one more wheels of the vehicle.

In some examples, spring displacement force calculation may include use of wheel to body relative distance for all four corners, to generate a force from ride rate data. This ride rate data may be input as a calibration, and found through vertical suspension testing independent of longitudinal forces. Example equations for spring displacement force are provided below:

$$F_{z_{riderate\_LF}} = F(x_{LF})$$

$$F_{z_{riderate\_RB}} = F(x_{RF})$$

$$F_{z_{riderate\_LR}} = F(x_{LR})$$

$$F_{z_{riderate\_RR}} = F(x_{RR})$$

Anti-dive/anti-lift compensation may include quantification of a characteristic of some suspensions to absorb longitudinal forces in the vertical direction. This characteristic can be quantified using anti-dive/anti-lift factors found through vertical suspension testing with longitudinal force inputs. Example equations for anti-dive/anti-lift compensation are provided below:

$$F_{z_{antidive\_LF}} = a_x * r_{anti\ dive,front} * m_{2\ pass,LF}$$

$$F_{z_{antidive\_RF}} = a_x * r_{anti\ dive,front} * m_{2\ pass,RF}$$

$$F_{z_{antidive\_LR}} = a_x * r_{anti\ lift,rear} * m_{2\ pass,LR}$$

$$F_{z_{antidive\_RR}} = a_x * r_{anti\ lift,rear} * m_{2\ pass,RR}$$

Figure 7:
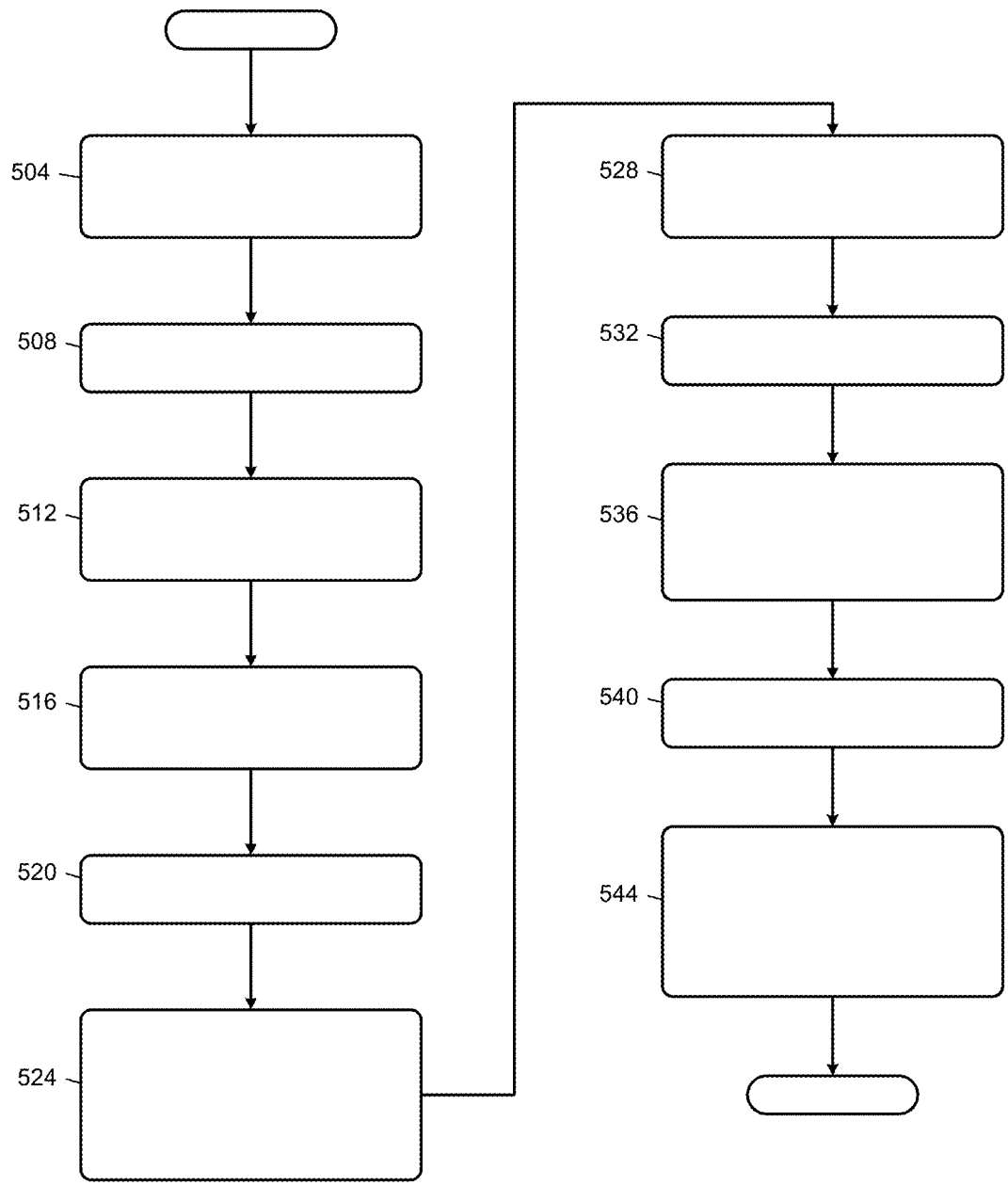
FIG. 7 is a flowchart depicting an example process for generating a spring-based normal force estimation.

FIG. 7 is a flowchart depicting an example process for generating a spring-based normal force estimation. The process may be performed by, for example, the vehicle control module 20 of FIG. 1 or the vehicle control module 120 of FIG. 3. At 504, the process begins by obtaining vehicle lateral and longitudinal acceleration parameters.

At 508, the vehicle control module is configured to obtain vehicle wheel height values from vehicle sensors, such as the vehicle sensors 24 of FIG. 1. At 512, the vehicle control module is configured to calculate suspension displacement force values based on the obtained parameters.

The control module is configured to determine longitudinal acceleration (Ay)-based anti-dive compensation at 516. At 520, the vehicle control module is configured to determine pitch angle-based anti-dive compensation. Control then proceeds to 524 to calculate an anti-dive/anti-lift compensation value using the longitudinal acceleration-based value and the pitch angle based value.

At 528, the vehicle control module is configured to determine a lateral acceleration (Ax)-based roll rate compensation value. Control then proceeds to 532 to determine a roll angle-based roll rate compensation value. At 536, the vehicle control module is configured to calculate a roll rate compensation using the lateral acceleration-based value and the roll rate-based value.

At 540, control is configured to calculate a suspension spring damping force, which may be a damping force currently experienced at one of the springs of suspension, associated with one of the vehicle wheels. At 544, the vehicle control module is configured to estimate a normal force of the wheel based on the spring displacement, the anti-dive/anti-lift compensation value, the roll rate compensation value, and the damping force value.

Figure 8:
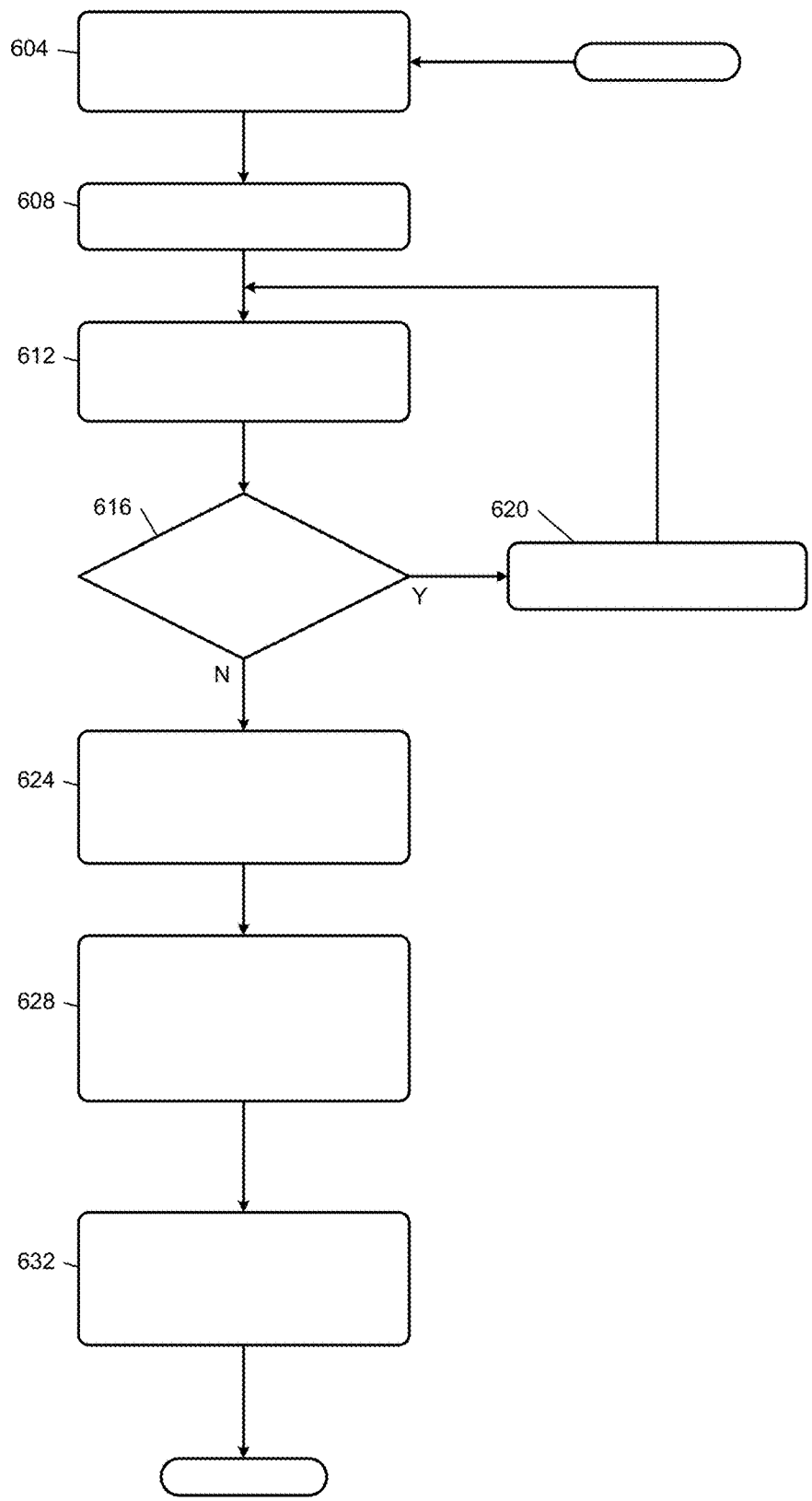
FIG. 8 is a flowchart depicting an example process for combining IMU-based and spring-based normal force estimation while accounting for failure modes.

FIG. 8 is a flowchart depicting an example process for combining IMU-based and spring-based normal force estimation while accounting for failure modes. The process may be performed by, for example, the vehicle control module 20 of FIG. 1 or the vehicle control module 120 of FIG. 3. At 604, the process begins by from the source estimation degradation modes.

Each normal force estimation degradation mode may correspond to a point in the visual parameter space where normal force estimation is unreliable due to effects of certain parameters making a normal force estimation method inaccurate.

At 608, the vehicle control module is configured to select a first degradation mode, which may correspond to a normal force estimation failure mode. At 612, the vehicle control module is configured to define vehicle parameters associated with the degradation mode. For example, control may determine which parameters of the vehicle are indicative of a location in the vehicle parameter space where the selected degradation failure mode may make the normal force estimation unreliable.

At 616, the vehicle control module determines whether any degradation modes are remaining. If so, control proceeds to 622 select a next degradation mode. If there are no degradation modes remaining at 616, control proceeds to 624 to label the degradation mode data based on identified associated vehicle parameters.

At 628, a machine learning model is trained to predict reliability for spring-based normal force estimation and IMU-based normal force estimation, based on the degradation modes. Further details for training example machine learning models are discussed further below with reference to FIGS. 9-11. At 632, the vehicle control module is configured to store the model for use in estimating normal force for one or more vehicle wheels, based on obtained vehicle parameters.

In some examples, failure modes are specific operating ranges of original system where system is highly sensitive to inputs/model/parameter uncertainties. The system may determine failure mode area within a parameter space of the operating vehicle parameter range, and compute distances to the failure modes for real-time reliability measurement using modeling.

For example, each of the normal force estimation methods (e.g., IMU-based and spring-based) may have their own degradation modes and dependencies to their input signals. In some examples, the reliability of the spring-based method is degraded when the reliability of ride height sensors is low, and the performance of the IMU-based method is highly dependent on reliability of vehicle mass estimation and lateral and longitudinal accelerations. A reliability assessment analysis on the input signals and subsystems degradation mode detection provides information to enhance the reliability of the estimated normal force.

In various implementations, specific failure modes are identified for failure/degradation modes of IMU-based and spring-based normal force estimation values. Example failure modes may include, but are not limited to, alignment of the IMU-based and spring-based estimation values, faulty sensor signals, ride height bias, a nonlinear region of the spring-based method, road roughness, road angle, hard braking, passive aerodynamics, and spring sag.

In some examples, a machine learning model is trained to determine reliability of each operating point in the vehicle parameter space from the identified failure modes. The model may perform fusion (e.g., combination) according to a weighted sum of the IMU-based estimation value and the spring-based estimation value, where the weight for each estimation value is proportional to its reliability.

Figure 9A:
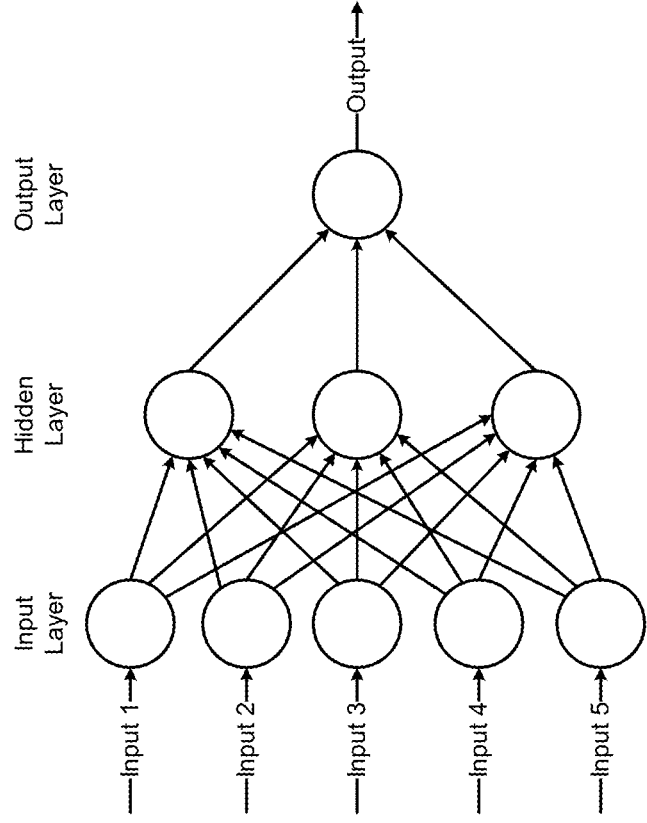
FIGS. 9A and 9B are graphical representations of example recurrent neural networks for predicting reliability of vehicle wheel normal force estimation values.
Figure 9B:
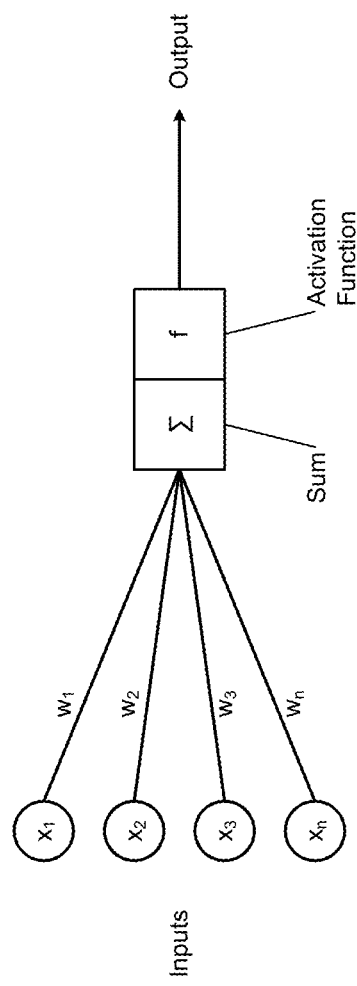

FIGS. 9A and 9B show an example of a recurrent neural network used to generate models such as those described above, using machine learning techniques. Machine learning is a method used to devise complex models and algorithms that lend themselves to prediction (for example, patient and provider matching predictions). The models generated using machine learning, such as those described above, can produce reliable, repeatable decisions and results, and uncover hidden insights through learning from historical relationships and trends in the data.

The purpose of using the recurrent neural-network-based model, and training the model using machine learning as described above, may be to directly predict dependent variables without casting relationships between the variables into mathematical form. The neural network model includes a large number of virtual neurons operating in parallel and arranged in layers. The first layer is the input layer and receives raw input data. Each successive layer modifies outputs from a preceding layer and sends them to a next layer. The last layer is the output layer and produces output of the system.

FIG. 9A shows a fully connected neural network, where each neuron in a given layer is connected to each neuron in a next layer. In the input layer, each input node is associated with a numerical value, which can be any real number. In each layer, each connection that departs from an input node has a weight associated with it, which can also be any real number (see FIG. 9B). In the input layer, the number of neurons equals number of features (columns) in a dataset. The output layer may have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause underfitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination (R2) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit). The neural network can receive inputs, e.g., vectors, which can be used to generate models that can be used for prediction of normal force estimation reliability, as described herein.

Figure 10:
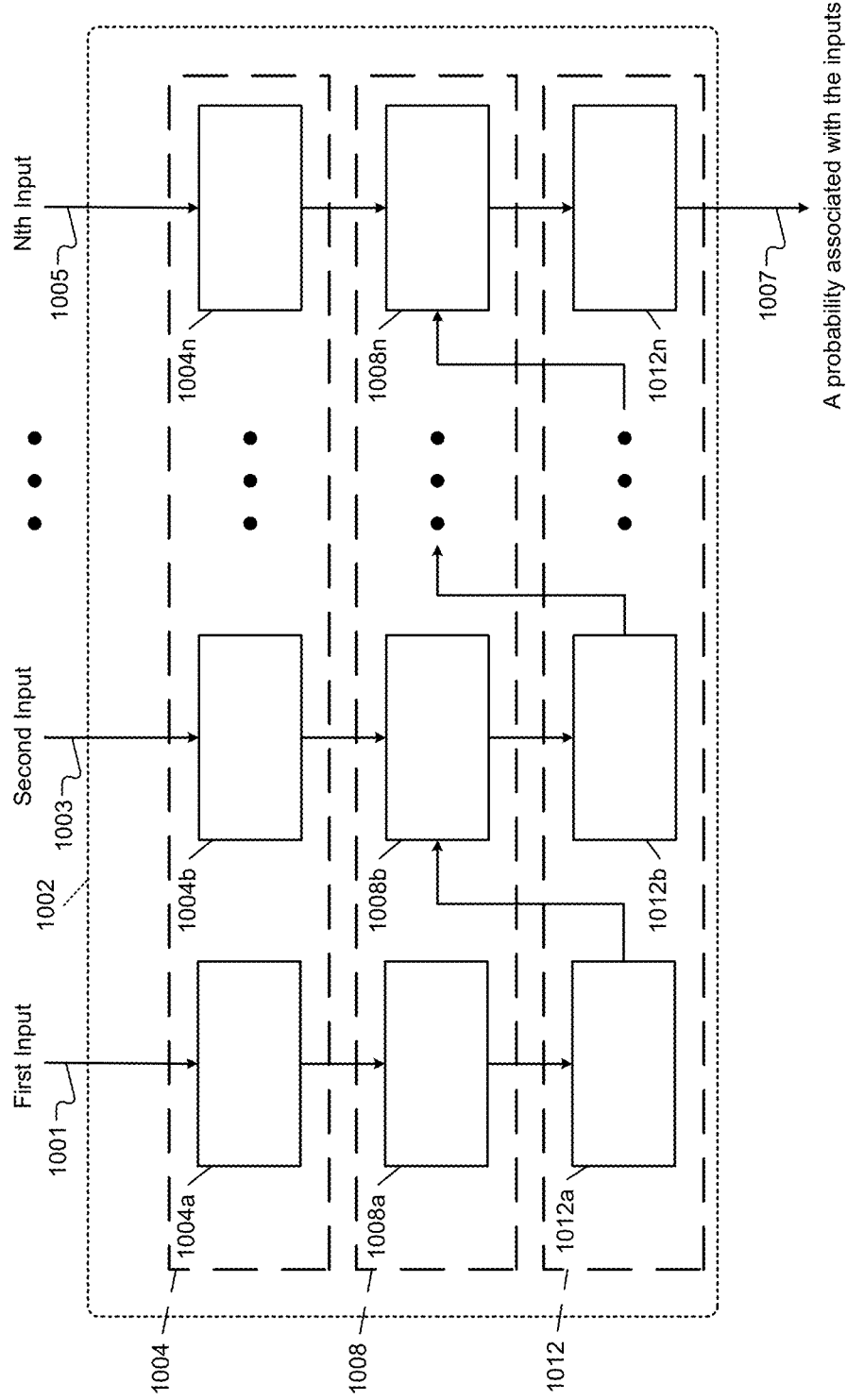
FIG. 10 is a graphical representation of layers of an example long short-term memory (LSTM) machine learning model.

FIG. 10 illustrates an example of a long short-term memory (LSTM) neural network 1002 used to generate models such as those described above, using machine learning techniques, although other example embodiments may include other types of machine learning models including transformer layers, other model topologies, etc. The generic example LSTM neural network 1002 may be used to implement a machine learning model, and various implementations may use other types of machine learning networks (such as transformer layers, other model topologies or architectures, etc.). The LSTM neural network 1002 includes an input layer 1004, a hidden layer 1008, and an output layer 1012. The input layer 1004 includes inputs 1004a, 1004b . . . 1004n. The hidden layer 908 includes neurons 1008a, 1008b . . . 1008n. The output layer 1012 includes outputs 1012a, 1012b . . . 1012n.

Each neuron of the hidden layer 1008 receives an input from the input layer 1004 and outputs a value to the corresponding output in the output layer 1012. For example, the neuron 1008a receives an input from the input 1004a and outputs a value to the output 1012a. Each neuron, other than the neuron 1008a, also receives an output of a previous neuron as an input. For example, the neuron 1008b receives inputs from the input 1004b and the output 1012a. In this way the output of each neuron is fed forward to the next neuron in the hidden layer 1008. The last output 1012n in the output layer 1012 outputs a probability associated with the inputs 1004a-1004n. Although the input layer 1004, the hidden layer 1008, and the output layer 1012 are depicted as each including three elements, each layer may contain any number of elements.

In various implementations, each layer of the LSTM neural network 1002 must include the same number of elements as each of the other layers of the LSTM neural network 1002. In some example embodiments, a convolutional neural network may be implemented. Similar to LSTM neural networks, convolutional neural networks include an input layer, a hidden layer, and an output layer. However, in a convolutional neural network, the output layer includes one less output than the number of neurons in the hidden layer and each neuron is connected to each output. Additionally, each input in the input layer is connected to each neuron in the hidden layer. In other words, input 1004a is connected to each of neurons 1008a, 1008b . . . 1008n.

In various implementations, each input node in the input layer may be associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

As mentioned above, the layers between the input and output layers are hidden layers. The number of hidden layers can be one or more (one hidden layer may be sufficient for many applications). A neural network with no hidden layers can represent linear separable functions or decisions. A neural network with one hidden layer can perform continuous mapping from one finite space to another. A neural network with two hidden layers can approximate any smooth mapping to any accuracy.

Figure 11:
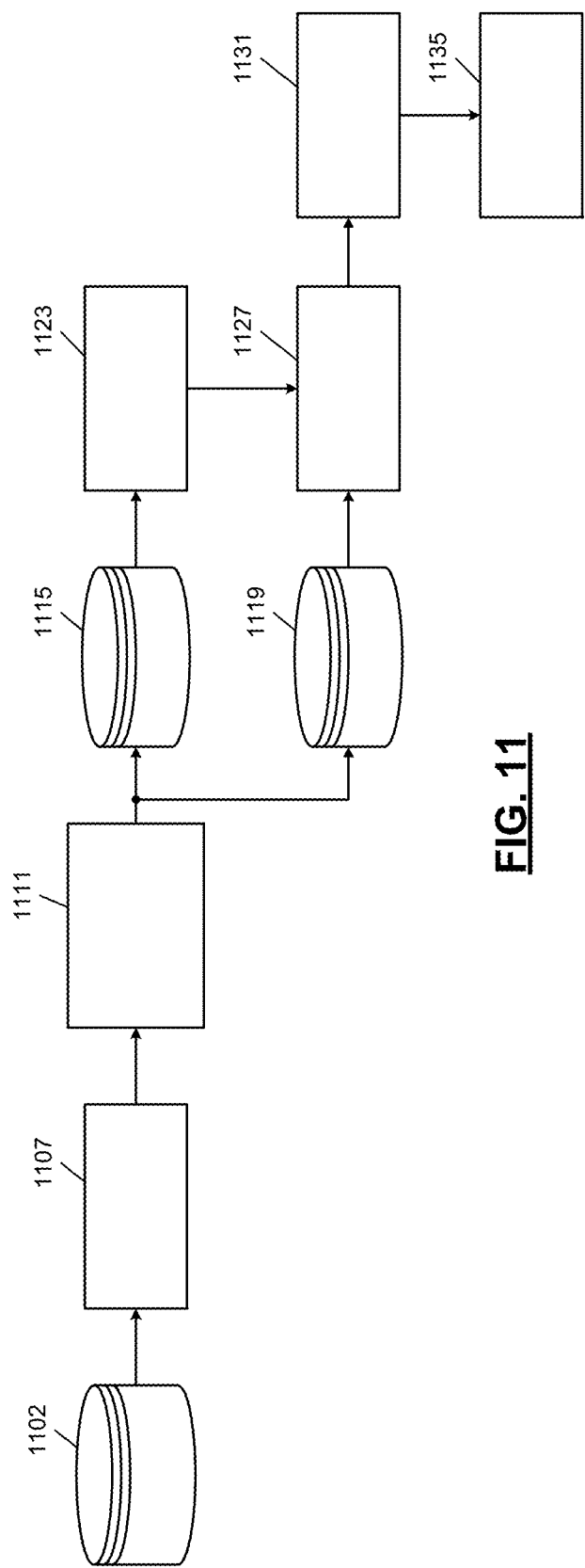
FIG. 11 is a flowchart illustrating an example process for training a machine learning model.

FIG. 11 illustrates an example process for generating a machine learning model. At 1107, control obtains data from a database 1102 (e.g., a data warehouse). The data may include any suitable data for developing machine learning models.

At 1111, control separates the data obtained from the database 1102 into training data 1115 and test data 1119. The training data 1115 is used to train the model at 1123, and the test data 1119 is used to test the model at 1127. Typically, the set of training data 1115 is selected to be larger than the set of test data 1119, depending on the desired model development parameters. For example, the training data 1115 may include about seventy percent of the data acquired from the database 1102, about eighty percent of the data, about ninety percent, etc. The remaining thirty percent, twenty percent, or ten percent, is then used as the test data 1119.

Separating a portion of the acquired data as test data 1119 allows for testing of the trained model against actual output data, to facilitate more accurate training and development of the model at 1123 and 1127. The model may be trained at 1123 using any suitable machine learning model techniques, including those described herein, such as random forest, generalized linear models, decision tree, and neural networks.

At 1131, control evaluates the model test results. For example, the trained model may be tested at 1127 using the test data 1119, and the results of the output data from the tested model may be compared to actual outputs of the test data 1119, to determine a level of accuracy. The model results may be evaluated using any suitable machine learning model analysis, such as the example techniques described further below.

After evaluating the model test results at 1131, the model may be deployed at 1135 if the model test results are satisfactory. Deploying the model may include using the model to make predictions for a large-scale input dataset with unknown outputs. If the evaluation of the model test results at 1131 is unsatisfactory, the model may be developed further using different parameters, using different modeling techniques, using other model types, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle wheel force control system comprising:
   multiple vehicle wheel height sensors each configured to measure a wheel height position of a corresponding wheel of a vehicle;
   a vehicle inertial measurement unit (IMU) configured to measure a lateral acceleration of the vehicle and a longitudinal acceleration of the vehicle; and
   a vehicle control module in communication with the multiple vehicle wheel height sensors and the vehicle IMU, the vehicle control module configured to:
      obtain vehicle wheel height parameters from the multiple vehicle wheel height sensors;
      obtain a vehicle lateral acceleration parameter and a vehicle longitudinal acceleration parameter from the vehicle IMU;
      estimate a pitch arm rotation value of the vehicle;
      determine a pitch center of the vehicle based on the pitch arm rotation value, the vehicle wheel height parameters and the vehicle lateral acceleration parameter and the vehicle longitudinal acceleration parameter;
      calculate a center of gravity of the vehicle according to the determined pitch center;
      determine an estimated normal force on at least one wheel of the vehicle based, at least in part, on the calculated center of gravity of the vehicle; and
      control operation of at least one vehicle component according to the estimated normal force.

2. The vehicle wheel force control system of claim 1, wherein the estimated normal force is an IMU-based estimated normal force, and the vehicle control module is configured to:
   determine a longitudinal acceleration-based anti-dive compensation value according to at least the vehicle longitudinal acceleration parameter;
   determine a pitch angle-based anti-dive compensation value according to at least the vehicle longitudinal acceleration parameter;
   calculate a combined anti-dive compensation value according to the longitudinal acceleration-based anti-dive compensation value and the pitch angle-based anti-dive compensation value; and
   determine a spring-based estimated normal force on the at least one wheel of the vehicle based, at least in part, on the combined anti-dive compensation value.

3. The vehicle wheel force control system of claim 2, wherein the vehicle control module is configured to:
   determine a lateral acceleration-based roll rate compensation value according to at least the vehicle lateral acceleration parameter;
   determine a roll angle-based roll rate compensation value according to at least the vehicle longitudinal acceleration parameter;
   calculate a combined roll rate compensation value according to the lateral acceleration-based roll rate compensation value and the roll angle-based roll rate compensation value; and
   determine a spring-based estimated normal force on the at least one wheel of the vehicle based, at least in part, on the combined roll rate compensation value.

4. The vehicle wheel force control system of claim 3, wherein the vehicle control module is configured to:
   calculate a suspension spring displacement value for at least one spring of a suspension of the vehicle;
   calculate a suspension spring damping force value for the at least one spring of a suspension of the vehicle; and
   determine the spring-based estimated normal force on the at least one wheel of the vehicle based, at least in part, on the suspension spring displacement value and the suspensions spring damping force.

5. The vehicle wheel force control system of claim 4, wherein the vehicle control module is configured to:
   determine, via a trained machine learning model, reliability scores for the IMU-based estimated normal force and the spring-based estimated normal force; and
   determined a combined estimated normal force on the at least one wheel of the vehicle according to a weighted combination of the IMU-based estimated normal force and the spring-based estimated normal force, wherein the weighted combination is assigned based on the reliability scores for the IMU-based estimated normal force and the spring-based estimated normal force.

6. The vehicle wheel force control system of claim 5, wherein:
the trained machine learning model is trained based on multiple failure modes each associated with at least one of the IMU-based estimated normal force and the spring-based estimated normal force; and
each of the multiple failure modes is associated with one or more corresponding vehicle parameters indicative of the failure mode.

7. The vehicle wheel force control system of claim 1, wherein the vehicle control module is configured to:
compare the vehicle longitudinal acceleration parameter to a specified excessive acceleration threshold;
reset a value of a vehicle pitch angle in response to the vehicle longitudinal acceleration parameter exceeding the specified excessive acceleration threshold; and
perform integration of the vehicle pitch rate in response to the vehicle longitudinal acceleration parameter being less than the specified excessive acceleration threshold.

8. The vehicle wheel force control system of claim 1, wherein the vehicle control module is configured to:
obtain a pitch center location function, wherein the pitch center location function is determined offline according to at least one geometry pattern of a suspension of the vehicle; and
determine the pitch center of the vehicle online, based at least in part on the pitch center location function.

9. The vehicle wheel force control system of claim 1, wherein controlling operation of at least one vehicle component includes at least one of:
controlling a position of a moveable aerodynamic surface of the vehicle based on the estimated normal force; or
controlling an amount of torque supplied to at least one wheel of the vehicle based on the estimated normal force.

10. The vehicle wheel force control system of claim 1, wherein the vehicle control module is configured to estimate the pitch arm rotation value of the vehicle by:
calculating a rotational pitch acceleration value of the vehicle based on the vehicle longitudinal acceleration parameter; and
estimating the pitch arm rotation value of the vehicle based on the calculated rotational pitch acceleration value using least squares.

11. The vehicle wheel force control system of claim 1, wherein the vehicle control module is configured to:
determine a rigid body lateral load transfer value of the vehicle;
determine a rigid body longitudinal load transfer value of the vehicle;
determine a suspension compensated lateral load transfer value of the vehicle;
determine a suspension compensated longitudinal load transfer value of the vehicle; and
determine the estimated normal force on the at least one wheel of the vehicle based, at least in part, on the rigid body lateral load transfer value, rigid body longitudinal load transfer value, suspension compensated lateral load transfer value and suspension compensated longitudinal load transfer value of the vehicle.

12. A vehicle wheel force control system comprising:
multiple vehicle wheel height sensors each configured to measure a wheel height position of a corresponding wheel of a vehicle;
a vehicle inertial measurement unit (IMU) configured to measure a lateral acceleration of the vehicle and a longitudinal acceleration of the vehicle; and
a vehicle control module in communication with the multiple vehicle wheel height sensors and the vehicle IMU, the vehicle control module configured to:
obtain vehicle wheel height parameters from the multiple vehicle wheel height sensors;
obtain a vehicle lateral acceleration parameter and a vehicle longitudinal acceleration parameter;
determine a longitudinal acceleration-based anti-dive compensation value according to at least the vehicle longitudinal acceleration parameter;
determine a pitch angle-based anti-dive compensation value according to at least the vehicle longitudinal acceleration parameter;
calculate a combined anti-dive compensation value according to the longitudinal acceleration-based anti-dive compensation value and the pitch angle-based anti-dive compensation value;
determine an estimated normal force on at least one wheel of the vehicle based, at least in part, on the combined anti-dive compensation value; and
control operation of at least one vehicle component according to the estimated normal force.

13. The vehicle wheel force control system of claim 12, wherein the vehicle control module is configured to:
determine a lateral acceleration-based roll rate compensation value according to at least the vehicle lateral acceleration parameter;
determine a roll angle-based roll rate compensation value according to at least the vehicle longitudinal acceleration parameter;
calculate a combined roll rate compensation value according to the lateral acceleration-based roll rate compensation value and the roll angle-based roll rate compensation value; and
determine the estimated normal force on the at least one wheel of the vehicle based, at least in part, on the combined roll rate compensation value.

14. The vehicle wheel force control system of claim 13, wherein the vehicle control module is configured to:
calculate a suspension spring displacement value for at least one spring of a suspension of the vehicle;
calculate a suspension spring damping force value for the at least one spring of a suspension of the vehicle; and
determine the estimated normal force on the at least one wheel of the vehicle based, at least in part, on the suspension spring displacement value and the suspensions spring damping force.

15. The vehicle wheel force control system of claim 12, wherein controlling operation of at least one vehicle component includes at least one of:
controlling a position of a moveable aerodynamic surface of the vehicle based on the estimated normal force; or
controlling an amount of torque supplied to at least one wheel of the vehicle based on the estimated normal force.

16. The vehicle wheel force control system of claim 12, wherein the vehicle control module is configured to determine, via a trained machine learning model, a reliability scores for the estimated normal force.

17. The vehicle wheel force control system of claim 16, wherein:
the trained machine learning model is trained based on multiple failure modes each associated with the estimated normal force; and
each of the multiple failure modes is associated with one or more corresponding vehicle parameters indicative of the failure mode.

18. A vehicle wheel force control system comprising:
multiple vehicle wheel height sensors each configured to measure a wheel height position of a corresponding wheel of a vehicle;
a vehicle inertial measurement unit (IMU) configured to measure a lateral acceleration of the vehicle and a longitudinal acceleration of the vehicle; and
a vehicle control module in communication with the multiple vehicle wheel height sensors and the vehicle IMU, the vehicle control module configured to:
 obtain vehicle wheel height parameters from the multiple vehicle wheel height sensors;
 obtain vehicle lateral acceleration and vehicle longitudinal acceleration parameters from the vehicle IMU;
 determine IMU-based estimated normal force on at least one wheel of the vehicle based, at least in part, on a calculated center of gravity of the vehicle;
 determine a spring-based estimated normal force on the at least one wheel of the vehicle based, at least in part, on a combined anti-dive compensation value and a calculated combined anti-dive compensation value;
 determine, via a trained machine learning model, reliability scores for the IMU-based estimated normal force and the spring-based estimated normal force;
 determined a combined estimated normal force on the at least one wheel of the vehicle according to a weighted combination of the IMU-based estimated normal force and the spring-based estimated normal force, wherein the weighted combination is assigned based on the reliability scores for the IMU-based estimated normal force and the spring-based estimated normal force; and
 control operation of at least one vehicle component according to the combined estimated normal force.

19. The vehicle wheel force control system of claim 18, wherein:
 the trained machine learning model is trained based on multiple failure modes each associated with at least one of the IMU-based estimated normal force and the spring-based estimated normal force; and
 each of the multiple failure modes is associated with one or more corresponding vehicle parameters indicative of the failure mode.

20. The vehicle wheel force control system of claim 18, wherein controlling operation of at least one vehicle component includes at least one of:
 controlling a position of a moveable aerodynamic surface of the vehicle based to the combined estimated normal force; or
 controlling an amount of torque supplied to at least one wheel of the vehicle based on the combined estimated normal force.

* * * * *